Sept. 10, 1968  R. M. WILSON  3,400,586
MAXIMUM DEMAND RECORDER FOR FLOWMETERS
Filed Dec. 19, 1966  2 Sheets-Sheet 1
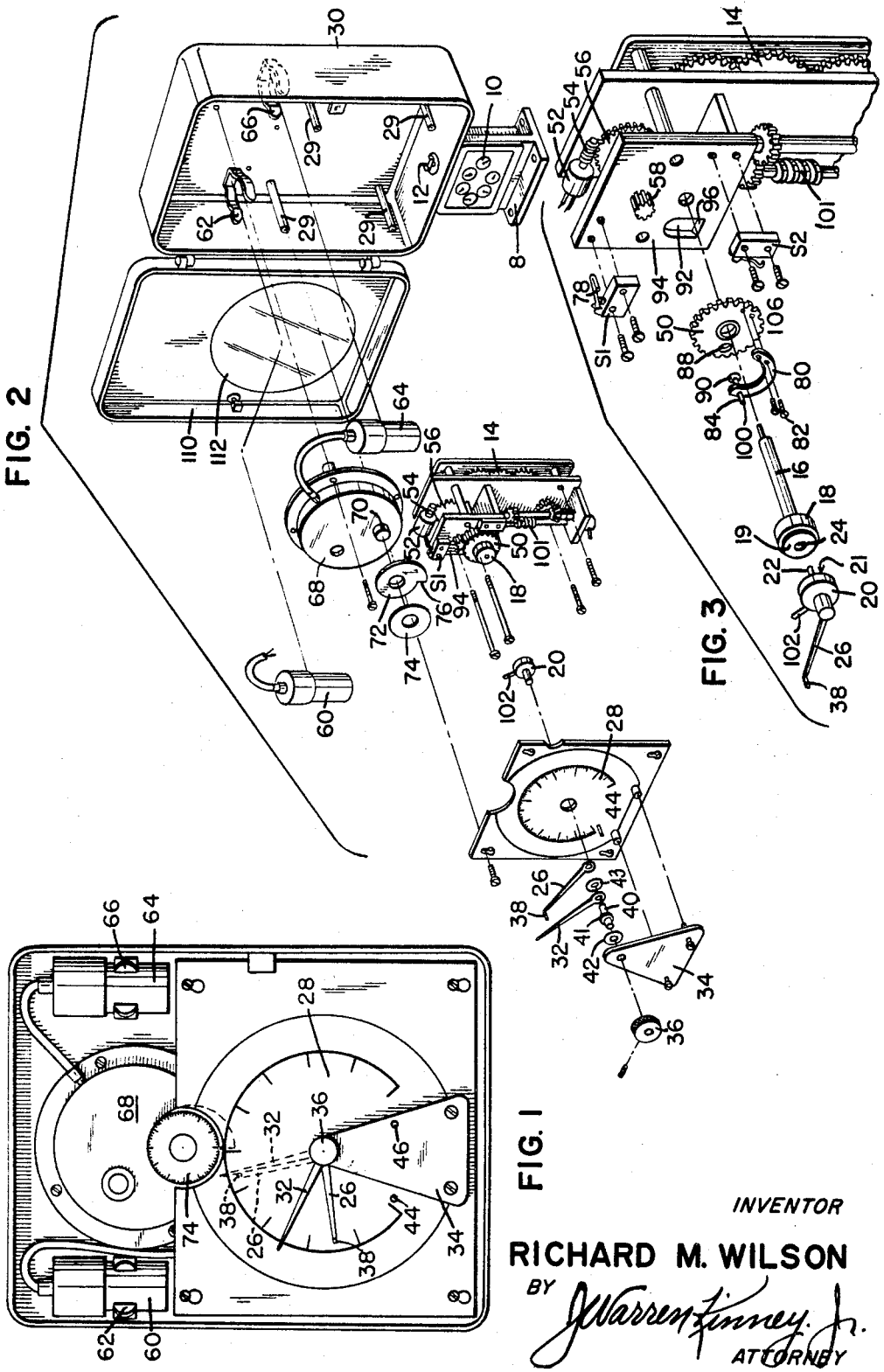
INVENTOR
RICHARD M. WILSON
BY J. Warren Kinney Jr.
ATTORNEY Sept. 10, 1968                R. M. WILSON                3,400,586
                  MAXIMUM DEMAND RECORDER FOR FLOWMETERS
Filed Dec. 19, 1966                                  2 Sheets-Sheet 2

INVENTOR
RICHARD M. WILSON
BY
*Warren Kinney Jr.*
ATTORNEY

United States Patent Office 3,400,586
Patented Sept. 10, 1968

3,400,586
MAXIMUM DEMAND RECORDER FOR FLOWMETERS
Richard M. Wilson, Cincinnati, Ohio, assignor to Mercury Instruments, Inc., Cincinnati, Ohio, a corporation of Ohio
Filed Dec. 19, 1966, Ser. No. 602,688
11 Claims. (Cl. 73—199)

ABSTRACT OF THE DISCLOSURE

A maximum demand recorder for flowmeters including a first indicator indicating the maximum flow during a predetermined period. A second indicator driven from the flowmeter advances the first indicator. The second indicator is periodically reset through a gear drive including a magnetic clutch, a motor-driven one-cycle gear which carries a longitudinally shiftable coupling pin. The pin is spring urged toward a retracted position and is advanced to its coupling position by a stationary cam.

---

This invention relates to a maximum demand recorder for flowmeters of the positive displacement or rotary type, which generally is used in measuring a gas or a liquid delivered under pressure to a consumer.

In a typical case, illuminating or heating gas may be delivered to a consumer's equipment, with payment therefor based on a measured quantity passing through the meter. It is often desirable to determine whether or not the quantity of fluid passed by the meter, at times exceeds a normal or agreed rate of flow. Any excessive rate of flow or demand, is to be registered by the maximum demand recorder of the present invention. The information given by the recorder is made available to an inspector, who may transmit the information to a supplier for use in making adjustments in the supply, the rate of charge, or for other purposes.

A primary object of the present invention is to provide in the maximum demand recorder, structural improvements to ensure reliability of operation, minimal servicing difficulties, and uniformly accurate readings.

Another object of the invention is to minimize the labor and cost of maintaining the recorder apparatus in perfect working condition, and to so construct the apparatus as to withstand hard usage, abuse, and possible inadvertent neglect or inattention thereto after application of the apparatus to a flowmeter, without resultant injury or damage to the working parts of the apparatus.

A further object is to provide a device of the character stated, which is completely self-contained, carries its own power supply, and is not dependent for its operation upon any outside or commercial source of electric power.

The foregoing and other objects are attained by the means described herein and illustrated upon the accompanying drawings, in which:

FIG. 1 is a front elevational view of the maximum demand recorder, omitting the usual mounting bracket and cumulative recording means.

FIG. 2 is an exploded perspective view of the device, including the mounting bracket 8 and cumulative recording means 10.

FIG. 3 is an enlarged exploded perspective view of an assembly illustrated by FIG. 2.

Figure 4:
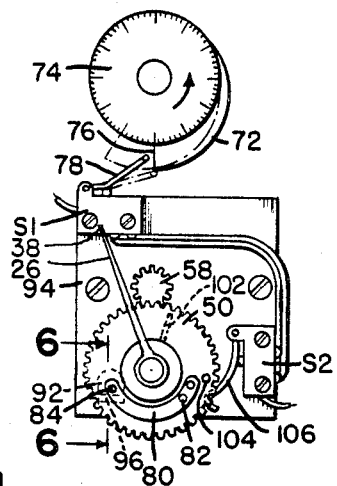
FIG. 4 is a front view of the FIG. 3 assembly, including a timing disc and reset cam, showing the relationship of parts occurring when the cam trips a motor switch S1.
Figure 5:
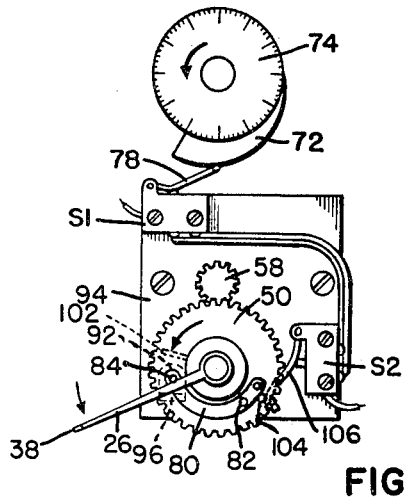
FIG. 5 is a view similar to FIG. 4, showing the relationship of parts occurring immediately following a resetting operation.

In the drawings, FIG. 2, the reference numeral 8 denotes a universal mounting bracket for installation upon a standard flowmeter, and includes means 10 for recording cumulatively the quantity of fluid measured and passed through the meter. The recording means 10 customarily includes a rotating shaft 12, sometimes referred to as a "wriggler," which rotates very slowly but in correspondency with the flow rate of fluid through the meter. Shaft 12 performs as a driver for the maximum demand recording device of the present invention.

Drive shaft 12, through suitable gearing 14 and 101, rotates a driven shaft 16 which carries at its outer end a fixed clutch member 18. Clutch member 18 normally drives a complementary clutch member 20, in the same direction and at the same speed, as the clutch member 18. The clutch comprising members 18 and 20, is a slip clutch, which normally remains engaged but may disengage automatically under certain conditions to be later described.

Uniformly satisfactory results have been obtained in those instances wherein the clutch members 18 and 20 are in the form of a permanently magnetized disc and a magnetizable armature, respectively, each having smooth axial faces 19 and 21 in flatwise contact with one another on a common axis of rotation, as best illustrated in FIG. 3. Suitable means are employed to maintain the clutch members in axial alignment at all times such as, by way of example, a pilot pin 22 secured to, carried by and projecting forwardly from axial face 21 of armature 20 and rotatably received in and supported by axial socket 24 in clutch member 18.

Clutch member 20, which is driven by clutch member 18, is adapted to advance an indicator pointer 26 over the calibrated face of a dial or chart 28 which indicates quantity of fluid passing through a meter during a predetermined time period, for example, one full day of twenty-four hours. Pointer 26 may properly be referred to as a sweep member, or primary quantity indicator, and may be fixedly mounted upon clutch member 20 to extend radially therefrom. Dial or chart 28 preferably is stationary, and may be fixed to the spacer posts 29 of housing 30.

A secondary indicator or pointer 32 is mounted upon a stationary bracket 34 for movement over the face of dial 28. This indicator or pointer has its butt end pivoted upon bracket 34, and includes a knob or finger piece 36 whereby it may be moved manually over the dial face, in a plane which is parallel to the plane in which the primary indicator moves. Primary indicator 26 carries a transversely disposed finger 38 which, upon clockwise advancement of indicator 26, strikes and moves the secondary indicator 32, as suggested by broken lines in FIG. 1.

The shaft 40 of indicator 32 (FIG. 2) may carry a friction washer 42 arranged to frictionally hold the indicator 32 lightly in any position to which it may be advanced by finger 38. Adjacent to washer 42, the shaft 40 so supports the hub of indicator 32, that this indicator may be rotated relative to knob 36, with modest frictional resistance provided by retaining washers 41 and 43. Thus, indicator 32 may be said to include a simple friction clutch of relatively weak holding power.

To ensure a desired operation of the apparatus, the frictional resistance of slip clutch 18–20 should exceed that of clutch 41–43. Accordingly, indicator 26 driven by shafts 16 and 12, may advance the indicator 32 in clockwise direction through the agency of finger 38; but counter-clockwise manual rotation of knob 36 will not cause indicator 32 to drive the indicator 26 toward stop 44, due to the inferior driving capability of clutch 41–43.

Advancement of the indicators 26 and 32 in the clockwise direction, may be limited or terminated by an obstructive limit stop 46. It should here be noted that an extreme advancement of the indicators against the limit stop, will cause no damage to the apparatus or its driving means, due to the presence of slip clutches 18–20 and 41–43, which will automatically slip or disengage when their associated indicators impinge upon the limit stop.

As was previously pointed out, the primary indicator 26 is mechanically driven in clockwise direction by shaft 12 of recording means 10, and carries with it the secondary indicator 32 due to engagement of finger 38 therewith. Return of the indicators to home position may be accomplished by manually grasping and moving them in counter-clockwise direction, this being possible even though shafts 12 and 16 may be in motion tending to drive the primary indicator 26 in clockwise direction through clutch 18–20, which will then disengage by slipping.

Upon driven shaft 16 is supported loosely, for relative rotation, a control gear 50. The control gear is adapted to be driven, at times, by a small intermittently operative electric motor 52, through the agency of a worm 54 meshing with worm gear 56, and which worm gear 56 is fixed upon a shaft carrying pinion 58. Pinion 58 rotates with worm gear 56, and is in constant mesh with control gear 50. Motor 52 may be powered by a single dry cell 60 held by a clip 62 within housing 30.

A second dry cell 64, held in a clip 66, furnishes electric current to actuate a motor-driven timer 68 which is constantly driven. The timer has a rotating drive shaft 70, upon which is fixed a switch-actuating drop-off type cam 72. A timing disc 74 is friction-fitted to cam 72, said disc being calibrated to indicate, preferably, the daytime hours and the night hours between noon and midnight. Timing disc 74 may be indexed to the step 78 of cam 72, for establishing the exact hour of the day or night, that motor 52 will be briefly energized to effect a counter-clockwise rotation of control gear 50. The purpose of rotating the control gear is to reset the primary indicator 26 to home position (counter-clockwise rotation), without disturbing the advanced position of secondary indicator 32, as will be explained.

Figure 7:
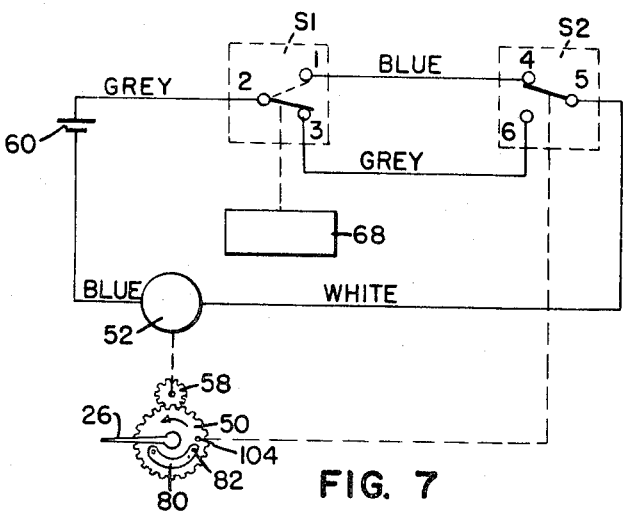
FIG. 7 is a wiring diagram showing control circuits for a reset motor 52.

It is important to understand that timer 68 may be driven by means of a spring motor, or other type of motor, if desired. The manner in which timer 68, motor 52 and switches S1 and S2 cooperate can best be seen with reference to FIGURE 7. This figure represents the condition of the switches at the completion of a reset operation. Assuming that the resetting operation is to take place once every twenty-four hours, shortly before the end of the twenty-four hour period the high point on cam 72 driven by timer 68 will cause switch S1 to be actuated, i.e. its pole will be switched from contact 3 to contact 1 as indicated by dotted lines in FIGURE 7. When this occurs, a circuit is completed to motor 52 through switch S1 and switch S2. Motor 52 begins to rotate, driving gear 50. However, as soon as the gear rotates a few degrees (and before pin 90 is advanced into contact with arm 102), switch S2 is actuated by the disengagement of pin 104 with the switch arm 106. As a result, the contact arm of switch S2 is shifted into engagement with contact 6, breaking the circuit to motor 52. This temporarily stops further rotation of gear 50. Subsequently, at the end of the twenty-four hour period, the follower arm 78 of switch S1 drops off the step of cam 76. Microswitch S1 is then again actuated to return its arm into engagement with contact 3. At this time, a circuit is again completed through switches S1 and S2 to motor 52. Motor 52 then continues to rotate, driving gear 50 until the gear completes one revolution, at which time pin 104 again actuates switch S2 to return its switch arm into engagement with contact 4, opening the circuit to motor 52.

Control gear 50 carries an arcuate leaf-spring 80, one end of which is secured to a face of gear 50, as by means of screws 82. The opposite free end of spring 80 carries a reset pin 84, preferably in the form of a headed adjustment screw attached to the spring by means of two jam nuts 86. The pin or screw 84 may pass through an enlarged opening 88 in gear 50, to dispose the head 90 thereof laterally from one face of the gear and into an opening 92 of the stationary support plate 94.

Figure 6:
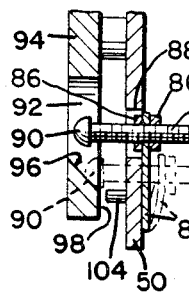
FIG. 6 is a cross-sectional view taken along line 6—6 of FIG. 4.

When control gear 50 is rotated by means of motor 52, which occurs upon closing of the contacts of switch S1, the head 90 of pin or screw 84 is advanced onto an incline 96 in opening 92, which incline guides the head onto the inner planar face 98 of support plate 94, for extending the forward end 100 of the pin or screw to the broken line position of FIG. 6. The pin or screw remains extended, against the yielding force of spring 80, until gear 50 nearly completes a full rotation, at which time the head 90 drops back into opening 92.

While the pin or screw 84 is extended as above explained, it reaches out sufficiently to engage a small pin 102 extending from the hub of primary indicator 26, thereby to drive said indicator to home position as gear 50 rotates with the pin or screw end 100 extended. In the course of this homing of indicator 26, clutch 18–20 will disengage by slipping, to permit return of the indicator to home position notwithstanding any rotation of shaft 16 tending to drive the indicator in the opposite or advancing direction.

Upon an approximate full rotation of control gear 50 by motor 52, pin or screw end 100 will have been retracted by spring 80, to free the primary indicator 26 for advancement by shaft 16. At approximately the time of retraction of pin or screw end 100, a stud 104 extending from gear 50 will strike the actuator 106 of a microswitch S2, connected in the circuit of motor 52, for de-energizing said motor and thereby terminating the indicator resetting operation.

The contactors of micro-switches S1 and S2 are series connected with reset motor 52, so that as the timing cam 72 continues to be rotated by the motor of timer 68, the cam-actuated switch S1 will be reset in readiness to initiate a subsequent periodic indicator reset by energization of motor 52.

In a typical installation, the timer will rotate the cam 72 once in a 24-hour period. During such period, the register device 10 associated with a fluid meter, will record cumulatively the quantity of fluid passed by the meter. The "wriggler," or drive shaft 12, will rotate in correspondency with the fluid meter output, as determined by demand. Consequently, in any 24-hour period, the primary indicator 26 may sweep a substantial area of dial 28, carrying with it the secondary indicator 32. The secondary indicator 32 will remain at the highest demand reading on dial 28, irrespective of the number of times a resetting of the primary indicator may occur. In the typical installation, primary indicator 26 will undergo resetting seven times in one week, but secondary indicator 32 will register only the highest demand occurring during that seven-day period. Should the apparatus be permitted to operate for thirty days continuously, the secondary indicator 32 will be found to register the highest demand that occurred during the thirty-day period.

The apparatus of the invention is highly reliable and accurate in service, and is particularly immune to damage or injury to its working parts regardless of the length of time it may remain in operation without attention. At every resetting, the motor 52 acts to return the primary indicator to home position at uniform controlled speed, without shock or strain upon the working parts; and the slip clutch ensures the parts againts damage even though an unusually high demand may result in advancement of the indicators tending to over-run the limits of the calibrated dial.

The reduction gearing at 101 preferably is of a type which may be varied as to its transmission ratio, thereby to accommodate the apparatus to flowmeters of different through-put capacities. That is, the speed of rotation of driven shaft 16 relative to that of drive shaft 12, may be changed by adjusting the gearing 101 to maintain the sweep of indicator 26 within the limits of dial 28 during a given time period, irrespective of the size or capacity of the flowmeter to which the demand recorder is applied.

The device of the invention is a completely self-contained unit having its own power supply in the form of standard dry cells 60 and 64, so that the device is operative in remote locations where commercial electric operating current is unavailable. As was previously suggested, timer 68 might be driven by a spring motor or equivalent driving means. The universal mounting bracket 8 and standard volume recorder 10 used in conjunction with the device of the invention, renders it applicable to all popular flow meters in common use.

In FIG. 2, the reference numeral 110 indicates an access door hinged upon housing 30, the door preferably having a window 112 through which the indicator readings may be observed. By opening the door 110, access may be had to reset knob 36, and to the primary and secondary indicators 26 and 32, either or both of which may be manually returned to the home position against stop 44 without risk of injury to the operating mechanism, due to the incorporation of magnetic slip clutch 18–20.

It is to be understood that various modifications and changes may be made in the structural details of the device, within the scope of the appended claims, without departing from the spirit of the invention.

I claim:

1. A maximum demand recording device for use in conjunction with a fluid flowmeter of the type including a drive shaft rotatable in response to a quantity of fluid passing through the meter, said maximum demand recording device comprising a driven shaft rotatable in synchronism with said drive shaft, a pivoted primary quantity indicator shiftable from a home position, a slip clutch interconnecting said driven shaft and said primary quantity indicator for advancing the latter from said home position in accordance with the quantity of fluid flow detected by said flowmeter, said slip clutch comprising a first rotatable member and a second rotatable member, one of said members comprising a permanent magnet having a smooth transverse face, the other of said members comprising a magnetizable member having a smooth transverse face, means mounting said members with their transverse faces in engagement, said members being rotatable relative to one another but immovable axially relative to one another, a pivoted secondary indicator, abutment means carried by said primary indicator for engagement with said secondary indicator for advancing said secondary indicator away from said home position for recording the maximum displacement of said primary indicator away from said home position, and reset means including an electric motor and timer means effective to energize said motor upon the expiration of a predetermined time period to drive the primary quantity indicator to said home position, means interconnecting said motor with said primary indicator on the side of said magnetic clutch remote from said driven shaft, whereby slippage occurs between the two members of said magnetic clutch when said primary quantity indicator is returned to its home position, said secondary indicator remaining in its advanced position when said primary indicator is reset to its home position.

2. The device as specified in claim 1 wherein means are provided for holding said first and second magnetic clutch members in axial alignment, said means comprising a pilot pin projecting from the transverse face of one of said members and a socket formed in the transverse face of the other of said members, said pilot pin being disposed within said socket.

3. The device of claim 1 in which said reset means further comprises a cam driven by said timer, a first switch actuated by said cam upon expiration of a predetermined time period to energize said motor and thereby effect initiation of a reset cycle, and a second switch for deenergizing said motor when said primary indicator has been returned to its home position.

4. The device of claim 1 in which the means interconnecting said motor and said primary indicator comprise a first abutment member rotatable with said primary indicator, a rotatable gear driven by said motor, a second abutment member carried by said gear and shiftable axially into engagement with said first abutment member, spring means normally urging said second abutment away from said first abutment, and stationary cam means effective upon rotation of said gear to shift said second abutment member axially toward said first abutment.

5. The device of claim 1 further comprising means for manually resetting said secondary indicator to said home position, said second means including a friction clutch, said last named friction clutch having a lower coefficient of friction than said magnetic clutch.

6. The device of claim 1 in which said stop means are provided for limiting movement of said primary and said secondary indicators away from said home position.

7. A maximum demand recording device for use in conjunction with a fluid flowmeter of the type including a drive shaft rotatable in response to a quantity of fluid passing through the meter, said maximum demand recording device comprising a driven shaft rotatable in synchronism with said drive shaft, a pivoted primary quantity indicator pivotal from a home position, a slip clutch interconnecting said driven shaft and said primary quantity indicator for advancing the latter from said home position in accordance with the quantity of fluid flow detected by said flowmeter, a pivoted secondary indicator, abutment means carried by said primary indicator for engagement with said secondary indicator for advancing said secondary indicator away from said home position for recording the maximum displacement of said primary indicator away from said home position, and reset means operative upon the expiration of a predetermined time period to return the primary quantity indicator to said home position while leaving said secondary indicator in its advanced position, said means including a gear mounted upon said driven shaft for rotation relative thereto, a reset motor for driving said gear, a timer for initiating operation of said motor, switch means for deenergizing said motor when said gear has made one complete revolution, a first abutment member mounted for rotation with said primary indicator, a second abutment member carried by said gear, spring means normally retracting said second abutment member relative to said first abutment member, stationary cam means engageable with said abutment member for advancing said abutment member toward said first abutment member, whereby said second abutment member engages said first abutment member upon rotation of said gear.

8. The device of claim 7 in which said slip clutch is a magnetic clutch.

9. The device of claim 7 in which said spring means comprise a cantilever spring secured at one end to said gear, said abutment member being carried by the free end of said cantilever spring, and opening in said gear, said abutment member being telescopically disposed within said opening.

10. The device of claim 9 in which said stationary cam means comprise a plate, an aperture formed in said plate for receiving said abutment member, a portion of said aperture having an angulated cam face effective to cam said abutment member outwardly under the face of said plate upon rotation of said gear.

11. The device of claim 7 in which said reset means further comprise a cam rotatable by said timer, and a second switch actuated by said cam, said second switch being in series connection with said first named switch.

References Cited
UNITED STATES PATENTS

| | | | |
|---|---|---|---|
| 1,805,118 | 5/1931 | Vittinghoff | 73—199 |
| 2,132,256 | 10/1938 | Cameron | 324—103 |
| 2,475,573 | 7/1949 | Smith et al. | 192—84 |
| 3,034,056 | 5/1962 | Terry | 324—103 |

JAMES J. GILL, *Primary Examiner.*

ROBERT S. SALZMAN, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,586                                    September 10, 1968

Richard M. Wilson

It is certified that error appears in the above identified patent and that said Letters Patent are hereby corrected as shown below:

Column 6, line 56, "a", first occurrence, should read -- an electric --.

Signed and sealed this 27th day of January 1970.

(SEAL)
Attest:

Edward M. Fletcher, Jr.                            WILLIAM E. SCHUYLER, JR.
Attesting Officer                                         Commissioner of Patents